United States Patent
Toussi et al.

(10) Patent No.: US 7,286,589 B1
(45) Date of Patent: Oct. 23, 2007

(54) METHOD AND APPARATUS FOR GENERATION OF DOWNLINK SCRAMBLING CODE IN WIDEBAND CDMA MOBILE DEVICES

(75) Inventors: Karim Nassiri Toussi, Belmont, CA (US); Debarag Banerjee, Sunnyvale, CA (US); Gokhan Cosgul, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 780 days.

(21) Appl. No.: 10/651,848

(22) Filed: Aug. 29, 2003

(51) Int. Cl.
*H04B 1/00* (2006.01)

(52) U.S. Cl. .................. 375/130; 375/147; 375/342; 708/252

(58) Field of Classification Search ............. 375/130, 375/147; 370/342; 708/252
See application file for complete search history.

(56) References Cited

U.S. PATENT DOCUMENTS

| | | | |
|---|---|---|---|
| 6,667,708 B2 * | 12/2003 | Schooler et al. ............. 341/173 |
| 6,735,606 B2 * | 5/2004 | Terasawa et al. ............ 708/252 |
| 6,937,643 B2 * | 8/2005 | Li et al. ...................... 375/147 |
| 6,956,948 B1 * | 10/2005 | Hwang et al. ................ 380/46 |
| 2003/0223397 A1 * | 12/2003 | Iacono et al. ................ 370/342 |

* cited by examiner

*Primary Examiner*—Temesghen Ghebretinsae
*Assistant Examiner*—Juan Alberto Torres
(74) *Attorney, Agent, or Firm*—Brett A. Hertzberg; Merchant & Gould PC

(57) ABSTRACT

An initialization method is performed to initialize the states for producing downlink scrambling code for a wideband code division multiple access (WCDMA) mobile device. The initialization method uses an auxiliary linear feedback shift register (x-LFSR) advance the x-initial state to a new initial state that corresponds to a selected downlink scrambling code. The new initial state allows the remaining masks used for generating the downlink scrambling code to be fixed. Memory required to produce the downlink scrambling codes is therefore reduced, as it is no longer dedicated to storing the sets of masks corresponding to each of the possible downlink scrambling codes.

20 Claims, 2 Drawing Sheets

METHOD AND APPARATUS FOR GENERATION OF DOWNLINK SCRAMBLING CODE IN WIDEBAND CDMA MOBILE DEVICES

FIELD OF THE INVENTION

The present invention relates generally to wideband code division multiple access (WCDMA) mobile devices, and more particularly to generation of downlink scrambling code in WCDMA mobile devices.

BACKGROUND OF THE INVENTION

A number of standards have been promulgated with relation to the Third Generation Partnership Project (3GPP), including specifications related to wideband CDMA. One aspect of wideband CDMA involves the downlink scrambling code, or "Gold code". The downlink scrambling code is used to assist in differentiating between multiple base stations and multiple logic channels, as well as assisting in timing synchronization and other aspects.

In 3GPP wideband CDMA, the downlink scrambling code is generated by a scrambling code sequence generator. Scrambling code generators are replicated throughout a wideband CDMA network to perform various aspects as described above. A scrambling code generator includes two linear feedback shift registers (LFSRs), often referred to as the x and y LFSRs. The x and y LFSRs produce the downlink scrambling code based on a specific set of initial states and output masks. At the end of each radio frame (i.e., 38400 chips or samples), the scrambling code sequence generator is reset and the output sequence is repeated. The scrambling code may be generated from any arbitrary point in the frame, as opposed to the frame boundary, by using an appropriate set of x and y initial states, or an equivalently appropriate set of x and y masks.

DETAILED DESCRIPTION OF THE PREFERRED EMBODIMENT

Figure 1:
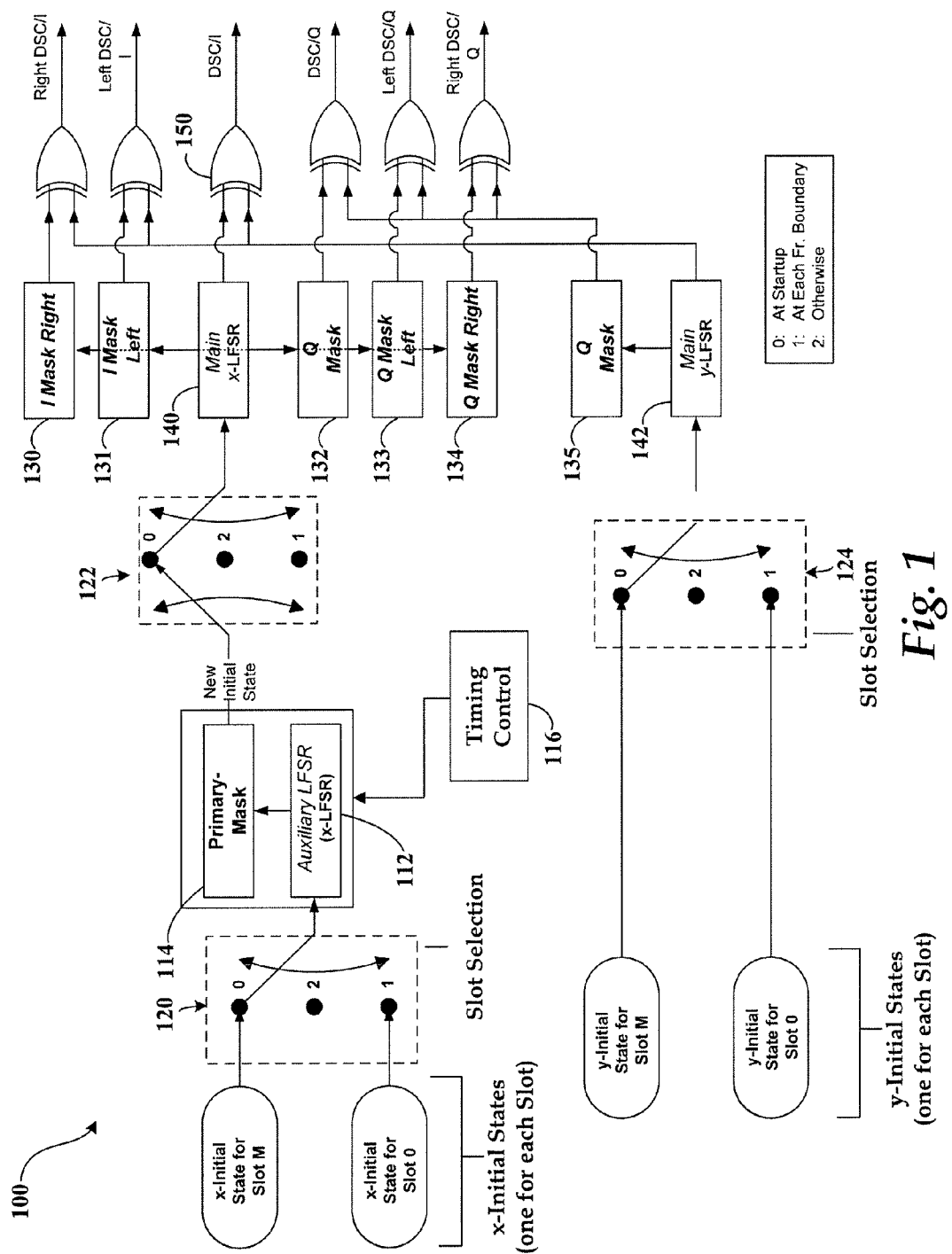
FIG. 1 illustrates a block diagram of a downlink scrambling code generator in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

In 3GPP, the scrambling codes for WCDMA downlink channels include a total of $2^{18}-1=262,143$ scrambling codes, numbered 0 . . . 262,142 that may be generated. However not all the scrambling codes are used. The scrambling codes are divided into 512 sets that each include a primary scrambling code and 15 secondary scrambling codes. There is a one-to-one mapping between each primary scrambling code and 15 secondary scrambling codes in a set (e.g., the 10th primary scrambling code corresponds to the 10th set of secondary scrambling codes).

Each of downlink scrambling codes is associated with a left alternative scrambling code and a right alternative scrambling code that may be used for compressed frames. The usage of alternative scrambling code for compressed frames is signaled by higher layers for each physical channel respectively.

Each cell is allocated one primary scrambling code. Certain downlink channels are always transmitted using the primary scrambling code. Other downlink physical channels are transmitted with either the primary scrambling code or a secondary scrambling code from the set associated with the primary scrambling code of the cell. The scrambling code sequences are constructed by combining two real sequences into a complex sequence. Each of the two real sequences are constructed as the position-wise modulo 2 sum of two binary sequences generated by means of two generator polynomials of degree 18 over successive 38400 chip intervals. The resulting sequences thus constitute segments of a set of Gold sequences. The scrambling codes are repeated for every 10 ms radio frame.

The present invention is generally directed to the initial state generation for the downlink scrambling codes. In previous designs, the states for the primary and secondary downlink scrambling codes were calculated and stored in memory. For example, 512 primary scrambling codes may be generated, each according to a set of masks. Accordingly, 512 sets of masks are required to generate the 512 primary scrambling codes. Storage for all of these sets of masks may be considerable, increasing the overhead for such a design. The present invention uses an auxiliary x-LFSR (linear feedback shift register) to generate the initial state for the main x-LFSR before operation for the main x-LFSR begins. The auxiliary x-LFSR allows the x and y masks for the left, right, and default modes to be fixed while the code sequence for various cells and start points are generated by using appropriate x and y initial states. The fixed masks reduce the number of sets that need to be stored in memory, reducing the storage needs and complexity of the downlink scrambling code generator.

FIG. 1 illustrates a block diagram of a downlink scrambling code generator in accordance with the present invention. The downlink scrambling code generator (100) includes auxiliary x-LFSR 112, primary-mask 114, timing control 116, logical switches 120, 122, and 124, fixed masks 130-135, main x-LFSR 140, main y-LFSR 142, and XOR logic gates (e.g., 150).

An x-initial state and a y-initial state is selected and provided to downlink scrambling code generator 100 depending on whether the process of generating the downlink scrambling code is at startup, at a frame boundary, or at another interval. The states for logical switches 120, 122, and 124 correspond to the selection of the x-initial state and the y-initial state. The x-initial state and y-initial state may be set to a pre-calculated value corresponding to a desired slot-jump, wherein a slot-jump refers to advancing generation of the downlink scrambling code to an arbitrary point within the frame, as opposed to the frame boundary.

Auxiliary x-LFSR 112 receives an initial state and generates a new initial state corresponding to one of the 512 primary indices or primary downlink scrambling codes using the calculated primary-mask 114. The combination of auxiliary x-LFSR 112 and primary-mask 114 is run for 18 samples. The corresponding 18 outputs from the 18 samples result in a new initial state that may be provided to main x-LFSR 140. Main x-LFSR 140 and main y-LFSR 142 are running continuously and synchronized (after the initial states are generated by the auxiliary x-LFSR) while downlink scrambling code generator 100 is functioning to generate scrambling codes. Main x-LFSR 140 uses the new initial state in combination with one of the fixed masks in producing the next downlink scrambling code.

Alternatively, when an initial state for a secondary downlink scrambling code is required, auxiliary x-LFSR is pre-run before the new initial state is provided to main x-LFSR 140. Timing control 116 triggers auxiliary x-LFSR 112 to pre-run for i samples in addition to the 18 samples described above, where i is the index for the desired secondary downlink scrambling code. The state of Auxiliary x-LFSR 112 is therefore advanced by i samples in addition to the 18 samples such that the initial state provided to main x-LFSR 140 now corresponds to the desired secondary downlink scrambling code.

The main x and y LFSRs (140, 142) are combined with the fixed masks (130-135) according to a logical AND operation. The logical AND operation results from the basic structure for a linear feedback shift register. The resulting outputs for the main x and y LFSRs (140, 142) and the fixed masks (130-135) are then logically combined according to the XOR logic gates (e.g., 150) to produce the outputs for the downlink scrambling code. The downlink scrambling code (DSC) produced by downlink scrambling code generator 100 is a complex-valued (I & Q) scrambling code. The downlink scrambling code includes an in-phase component (I) and a quadrature-phase component (Q). Downlink scrambling code generator 100 produces six outputs (right DSC/I, left DSC/I, DSC/I, DSC/Q, left DSC/Q, right DSC/Q), corresponding to the in-phase and quadrature-phase components, which are used for the downlink scrambling code. All primary and secondary downlink scrambling codes may be generated accordingly to the embodiment shown from the two x and y LFSRs (140, 142) by using fixed x and y masks (130-135), a fixed y initial state, and different x initial states. Producing the downlink scrambling code according to the present invention allows masks 130-135 to be fixed, reducing the storage capacity required and reducing the complexity of downlink scrambling code generator 100.

Figure 2:
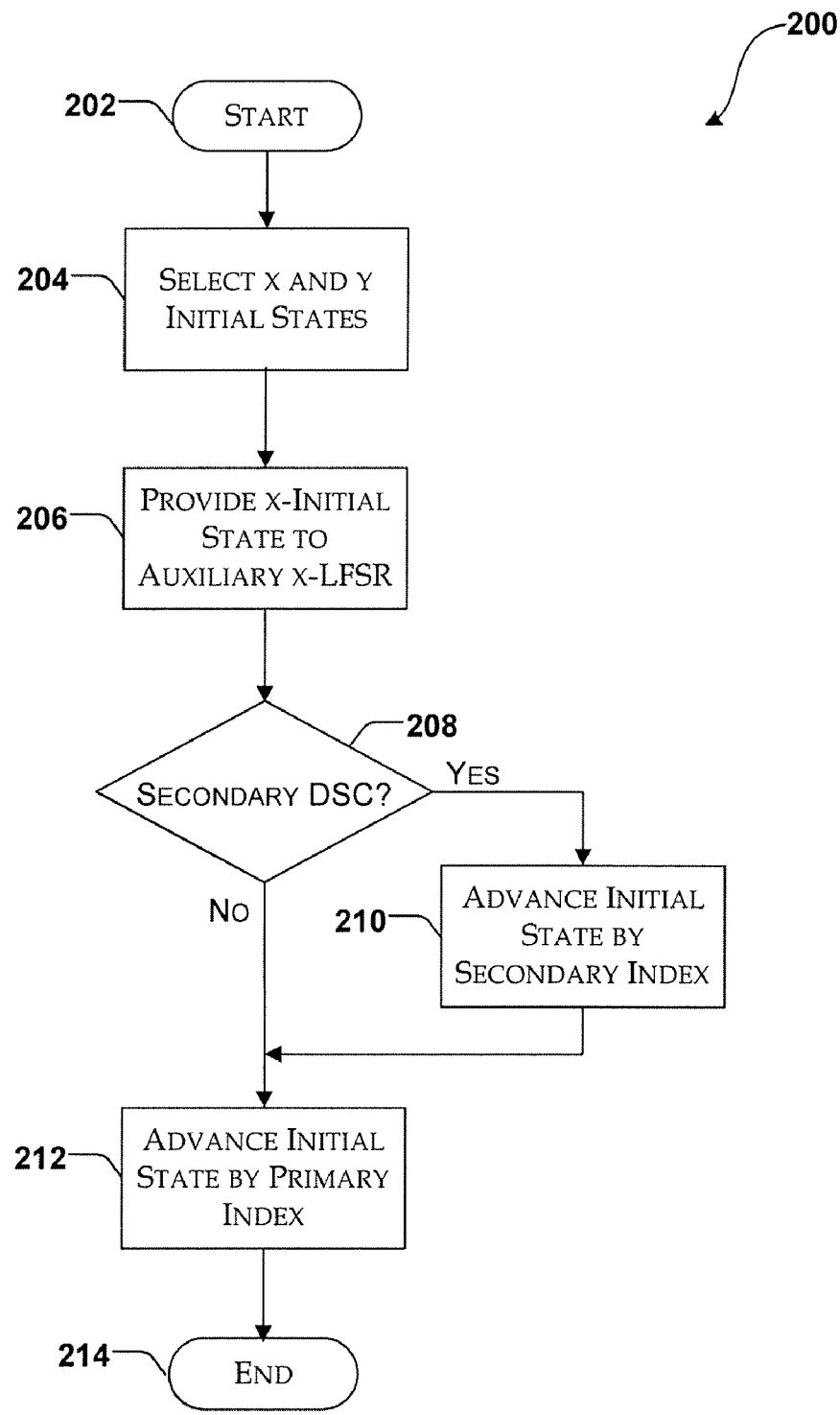
FIG. 2 illustrates a flow diagram of a process for producing downlink scrambling code in accordance with the present invention.

FIG. 2 illustrates a flow diagram of a process for producing downlink scrambling code in accordance with the present invention. Process 200 begins at start block 202. Processing continues at block 204.

At block 204, an x-initial state and a y-initial state are selected. As previously stated, the x-initial state and the y-initial state may be selected to provide for a slot-jump. A slot-jump is used when generation of the downlink scrambling code occurs at a point within a radio frame, as opposed to the boundary of the frame. The following table (Table 1) provides a list of some exemplary x and y initial state values for various slot starts:

TABLE 1 x and y initial states for various slot starts

| start slot | x-state | y-state |
| --- | --- | --- |
| 0 | 1 | 3ffff |
| 1 | cb66 | 181cb |
| 2 | 18a2d | 31854 |
| 3 | 29b53 | 1a1a0 |
| 4 | dc48 | 28233 |
| 5 | 3d522 | 3eff9 |
| 6 | 28b76 | 260b |
| 7 | 15547 | 3fef8 |
| 8 | 2a434 | 34469 |
| 9 | 34d64 | 329d3 |
| 10 | 27248 | 13f02 |
| 11 | e9e | 17bea |
| 12 | 8f2f | 294c7 |
| 13 | 20fbe | a8c3 |
| 14 | 37671 | e101 |

It is appreciated that the values given above are exemplary of possible initial state values only, and many other values for the initial states may be used. Once the x-initial state and y-initial state are selected, processing proceeds to block 206.

At block 206, the x-initial state is provided to the auxiliary x-LFSR, setting the initial state of the auxiliary x-LFSR to correspond to the selected x-initial state. Once the initial state of the auxiliary x-LFSR is set, processing proceeds to decision block 208.

At decision block 208, a determination is made whether the selected downlink scrambling code corresponds to a secondary downlink scrambling code. If the selected downlink scrambling code does not correspond to a secondary downlink scrambling code, then processing advances to block 212. Alternatively, if the selected downlink scrambling code corresponds to a secondary downlink scrambling code, processing moves to block 210.

At block 210, the initial state of the auxiliary x-LFSR is advanced by the secondary index. The secondary index refers to the 15 different secondary downlink scrambling codes that correspond to a primary downlink scrambling code. For example, the selected downlink scrambling code may be the secondary downlink scrambling code 10 of primary downlink scrambling code 501. In this example, the auxiliary x-LFSR is pre-run for 10 samples. Pre-running the x-LFSR by 10 samples advances the initial state of the x-LFSR by 10 samples prior to advancing the initial state of the x-LFSR according to the selected primary index (described below) of 501. The pre-run of the x-LFSR corresponding to the secondary index is triggered by timing control such that the initial state of the x-LFSR is advanced by both the secondary index and the primary index prior to operation of the main x-LFSR. In one example, the operation of the auxiliary x-LFSR is commenced at a selected time (e.g., 256 samples prior to generation of the downlink scrambling code) to adequately prepare the new initial state prior to its use by the main x-LFSR. Once the initial state of the auxiliary x-LFSR is advanced by the secondary index, processing proceeds to block 212.

At block 212, the initial state of the auxiliary x-LFSR is advanced according to the primary index. The primary index refers to the 512 previously calculated and stored primary downlink scrambling codes. The initial state of the auxiliary x-LFSR is advanced by combining (using the AND operation of an LFSR as explained in the discussion of FIG. 1) the initial state of the auxiliary x-LFSR with the primary-mask. In one example, the desired downlink scrambling code corresponds to a primary downlink scrambling code selected for generation. To achieve the new initial state that corresponds to the selected primary downlink scrambling code, the combination of the initial state of the auxiliary x-LFSR and the primary-mask is run for 18 samples. The corresponding 18 outputs from the 18 samples results in the new initial state. Once the initial state of the auxiliary x-LFSR is advanced according to the primary index by using the primary-mask, the new initial state is achieved for processing by the main x-LFSR, and processing proceeds to block 214 where the process ends.

Note that before the first frame boundary is reached, the states of x and y LFSRs are reset to initial states corresponding to the "0 Slot Jump" which is the beginning of the frame. The resetting of the states for the x and y LFSRs allows for the correct advancement of the initial state of the auxiliary x-LFSR during the next frame.

The downlink scrambling code generation method can be implemented using a combination of hardware and firmware. In one example, the control logic for producing the x and y initial states that are loading into the LFSR is implemented in firmware, while the rest of the generation of the downlink scrambling code is implemented in hardware.

Various embodiments of the invention are possible without departing from the spirit and scope of the invention. For example, the present invention can be used with wireless networks other than WCDMA.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for a downlink code generator to generate a downlink scrambling code, the method comprising:
    selecting a first initial state and a second initial state for the downlink code generator;
    providing the first initial state to an auxiliary linear feedback shift register in the downlink code generator;
    determining whether the downlink scrambling code of the downlink code generator is a secondary downlink scrambling code;
    advancing the first initial state of the downlink code generator according to a secondary index when the downlink scrambling code is a secondary downlink scrambling code; and
    advancing the first initial state of the downlink code generator according to a primary index such that the new initial state is produced.

2. The method of claim 1, further comprising providing the new initial state and second initial state to a first main linear feedback shift register in the downlink code generator and a second main linear feedback shift register in the downlink code generator, respectively, such that the downlink scrambling code is produced by combining a set of outputs corresponding to the outputs of the first main linear feedback shift register and the second main linear feedback shift register.

3. The method of claim 1, wherein the first initial state and the second initial state of the downlink code generator are selected such that they correspond to a predetermined slot jump.

4. The method of claim 1, wherein advancing the first initial state according to a secondary index further comprises pre-running the auxiliary linear feedback shift register in the downlink code generator for a predetermined number of samples that corresponds to secondary index.

5. The method of claim 4, wherein pre-running the auxiliary linear feedback shift register in the downlink code generator is triggered according to a timing control such that the first initial state is advanced according to the secondary index and the primary index prior to operation of the first main linear feedback shift register in the downlink code generator and a second main linear feedback shift register in the downlink code generator.

6. The method of claim 1, wherein advancing the first initial state according to a primary index further comprises combining the first initial state with a calculated primary-mask that corresponds to a selected primary downlink scrambling code for the downlink code generator.

7. The method of claim 1, further comprising fixing a set of masks used in producing the downlink scrambling code of the downlink code generator, whereby memory usage is reduced.

8. A method for a downlink code generator to generate a downlink scrambling code, the method comprising:
    selecting a first initial state and a second initial state for the downlink code generator;
    providing the first initial state to an auxiliary linear feedback shift register in the downlink code generator;
    producing a new initial state for the downlink code generator by advancing the first initial state according to at least one of a primary index and a secondary index;
    providing the new initial state and the second initial state to a first main linear feedback shift register in the downlink code generator and a second main linear feedback shift register in the downlink code generator, respectively; and
    producing the downlink scrambling code by combining a set of outputs corresponding to outputs of the first main linear feedback shift register in the downlink code generator and the second main linear feedback shift register in the downlink code generator.

9. The method of claim 8, wherein the first initial state and the second initial state for the downlink code generator are selected such that they correspond to a predetermined slot jump.

10. The method of claim 8, wherein advancing the first initial state according to a secondary index further comprises pre-running the auxiliary linear feedback shift register in the downlink code generator for a predetermined number of samples that corresponds to secondary index.

11. The method of claim 10, wherein pre-running the auxiliary linear feedback shift register in the downlink code generator is triggered according to a timing control such that the first initial state is advanced according to the secondary index and the primary index prior to operation of the first main linear feedback shift register in the downlink code generator and a second main linear feedback shift register in the downlink code generator.

12. The method of claim 8, wherein advancing the first initial state according to a primary index further comprises combining the first initial state with a calculated primary-mask that corresponds to a selected primary downlink scrambling code for the downlink code generator.

13. The method of claim 8, wherein the outputs of the first main linear feedback shift register in the downlink code generator and the second main linear feedback shift register in the downlink code generator are provided to at least one of a set of fixed masks to produce the set of outputs that are combined to produce the downlink scrambling code for the downlink code generator.

14. A downlink scrambling code generator, comprising:
an auxiliary linear feedback shift register that is arranged to receive a first initial state;
a primary-mask that is combined with an initial state of the auxiliary linear feedback shift register to produce a new initial state;
a first main linear feedback shift register that is arranged to receive the new initial state;
a second main linear feedback shift register that is arranged to receive a second initial state;
a set of fixed masks that are arranged to receive outputs from the first main linear feedback shift register and the second main linear feedback shift register; and
a set of logic gates that are arranged to produce a set of outputs in response to the outputs from the first main linear feedback shift register and the second main linear feedback shift register and other outputs from at least one of the set of fixed masks, wherein the set of outputs are combined to produce a downlink scrambling code.

15. The downlink scrambling code generator of claim 14, further comprising a timing control that is arranged to trigger the auxiliary linear feedback shift register to pre-run when the downlink scrambling code to be produced corresponds to a secondary downlink scrambling code.

16. The downlink scrambling code generator of claim 15, wherein auxiliary linear feedback shift register pre-runs a number of samples that corresponds to a secondary index that is related to the downlink scrambling code to be produced.

17. The downlink scrambling code generator of claim 14, wherein the primary-mask corresponds to one of a set of primary masks that each correspond to a set of possible primary downlink scrambling codes.

18. The downlink scrambling code generator of claim 14, wherein the set of fixed masks allows memory allocated to storing the state of each mask in the set of fixed masks to be minimized.

19. The downlink scrambling code generator of claim 14, wherein the set of logic gates are at least one of AND logic gates and XOR logic gates.

20. The downlink scrambling code generator of claim 14, wherein the first initial state and the second initial state are set to correspond to any selected slot jumps.

\* \* \* \* \*